Aug. 21, 1962     F. G. F. BEHLES     3,050,316
EQUALIZATION SPRING SYSTEM FOR VEHICLES, ESPECIALLY
MOTOR VEHICLES
Filed July 25, 1956
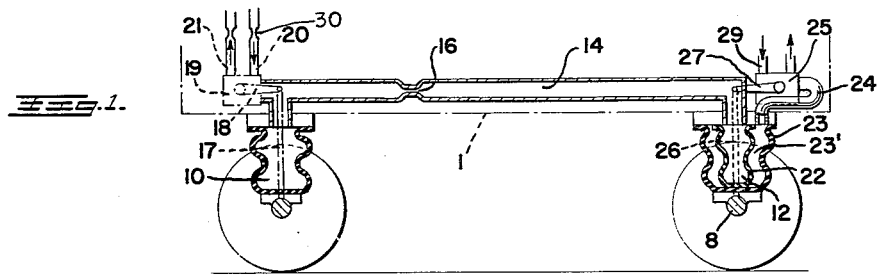
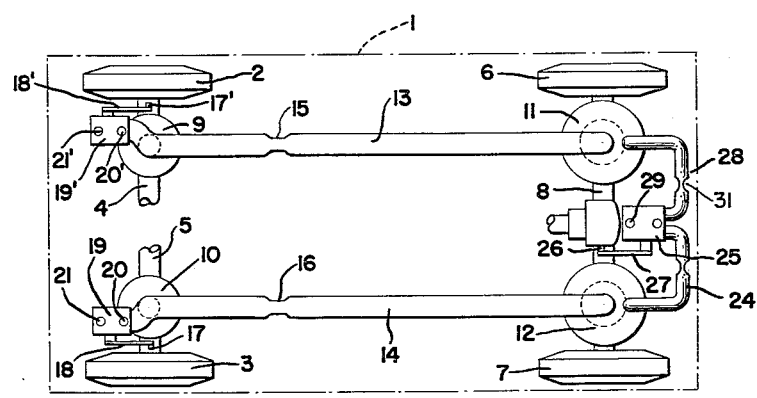
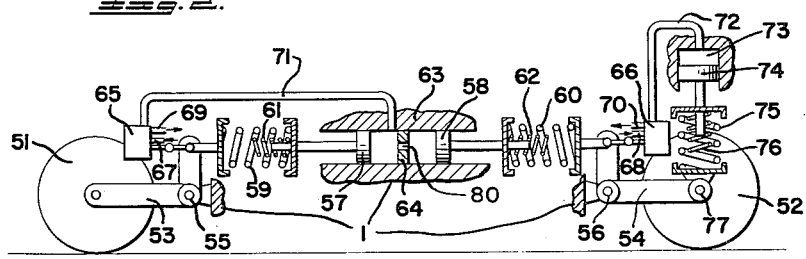
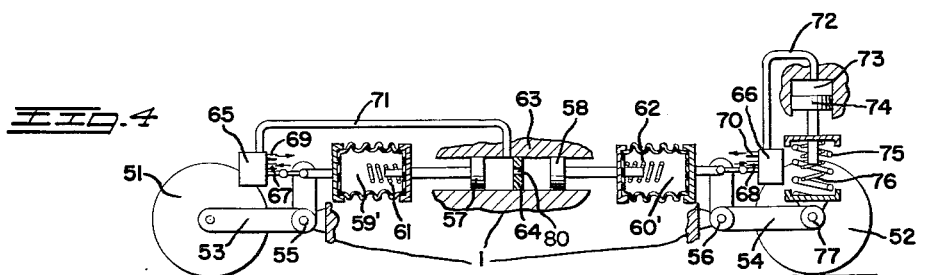
INVENTOR
FRANZ G. F. BEHLES
BY Dicke and Craig
ATTORNEYS

United States Patent Office 3,050,316
Patented Aug. 21, 1962

3,050,316
EQUALIZATION SPRING SYSTEM FOR VEHICLES, ESPECIALLY MOTOR VEHICLES
Franz G. F. Behles, Sindelfingen, Kreis Boblingen, Germany, assignor to Daimler-Benz Aktiengesellschaft, Stuttgart-Unterturkheim, Germany
Filed July 25, 1956, Ser. No. 600,026
Claims priority, application Germany Aug. 1, 1955
20 Claims. (Cl. 280—104)

The present invention relates to an equalization spring system which is effective between two wheels or axles of a vehicle, especially motor vehicles; more particularly the present invention relates to such a spring system in which, when one wheel approaches the vehicle frame, the other wheel is forcibly distanced or moved away from the frame.

Such spring systems require, for purposes of stabilization of the frame with respect to rotations about a horizontal cross axis, a stabilization arrangement which is constructed generally in the form of an additional spring between the wheel or axle and the vehicle frame. Those types of equalization spring systems are known in the prior art in which the additional spring is automatically displaced or adjusted and is operative in such a way that after a change in the static load of the vehicle, the distance between the wheel or axle with which the additional spring is associated and the frame is brought back or readjusted to the original desired value or distance. Such known types of spring systems, however, have the disadvantage that the frame, notwithstanding the aforementioned adjustment of the spring, remains in an inclined position and that the height of the center of gravity also remains changed because the equalization takes place only at the first wheel or axle with which the adjustable additional stabilizing spring is operatively associated.

These disadvantages are avoided by the present invention in that an additional automatic regulating arrangement is provided which is responsive to a change in the distance between the other, namely the second wheel or axle, which is not associated with the additional spring, and the frame from a predetermined, desired value whereby the control arrangement changes the effective length of the system, which brings about the equalization and which extends from one wheel or axle to the other wheel or axle, after a change in the static load in a direction toward maintaining constant the aforementioned distance at a predetermined, desired value.

In this manner the frame remains essentially horizontal with all static changes in load at the same desired height above the road bed.

Accordingly, it is an object of the present invention to provide a compensating mechanism for compensating static loads in a spring system for vehicles provided with an equalization system to equalize the dynamic road shocks and forces during operation of the vehicle.

Still another object of the present invention is to provide an equalization system in connection with a spring system for motor vehicles which is effective to compensate and equalize dynamic as well as static forces which may take place in the vehicle.

Still another object of the present invention is the provision of a simple arrangement of an equalization spring system which, in addition to equalizing dynamic forces, also compensates effectively for static changes in the load and which is operative to return and maintain the vehicle frame or superstructure at all times essentially parallel to the road bed.

Another object of the present invention resides in the provision of an equalization system for a vehicle spring system in which throttling means are used to effectively dampen and suppress nodding movements of the vehicle about a transverse axis.

Another object of the present invention resides in the provision of an equalization spring system the natural frequency of which remains essentially constant.

A further object of the present invention resides in the provision of an arrangement which by simple means effectively maintains a predetermined value of road clearance of the vehicle.

With pneumatic equalization spring systems in which both wheels or axles are interconnected by means of a compressible medium, preferably air, the present invention proposes a control arrangement including a pneumatic switch which controls the inflow into or escape of the pressure medium from the equalization spring system depending on the direction of change of the distance between the second wheel or axle and the frame from the predetermined value. Such an arrangement not only has the advantage that the change in length of the equalization system may be effected in a very simple manner, but also that the natural frequency of the vehicle remains essentially constant with all loads. This is due to the fact that the natural frequency of the system is determined by the swinging mass as well as by the stiffness of the spring system and that with an air spring system which stays in essentially the same position with different loads, i.e., where accordingly in this same position different air pressures exist at different times, the stiffness of the spring is exactly proportional to the load.

In order to obtain a uniformly constructed arrangement, it is recommended in such pneumatic spring systems according to the present invention to provide an additional spring system which is also in the form of a pneumatic spring system. The pressure space of such a spring system is then filled or emptied, as the case may be, by means of a pneumatic switch which is automatically actuated during deviations of the distance between the first wheel or axle and the frame from the predetermined value. A particularly favorable and space-saving arrangement results from an arrangement in which the pressure spaces of the pneumatic equalization spring system and of the pneumatic additional or auxiliary spring system are limited by bellows or the like of which one, preferably the bellows of the additional spring system, surrounds the other. However, it is also understood that in other cases it may be more advantageous if the two bellows are disposed one behind the other in the longitudinal direction of the vehicle, namely ahead and behind the axle respectively.

In order to avoid that the mechanism according to the present invention during driving reacts immediately or instantaneously to each relative movement of the wheels or axles with respect to the frame, i.e., in order to achieve that it will react only when a continuous change in the static load takes place, the present invention further proposes that the automatic control arrangement for the additional spring system and for the effective length of the equalization system is rendered effective or operative, in any known manner, as by any suitable conventional delay means, only when the wheel or the axle has remained at a distance from the frame different from the distance of the predetermined desired value for a predetermined length of time.

The change in length according to the present invention of the equalization system may be realized in equalization spring systems with mechanical springs according to a further feature of the present invention in such a manner that the control or regulating mechanism includes a hydraulic switch which, depending on the direction of change of the distance between the second wheel or axle and the frame from a predetermined value, permits an essentially incompressible pressure medium to flow in or escape from a hydraulic transmission element which is interconnected in the equalization rod system containing the mechanical springs. The hydraulic transmission mechanism may thereby consist of a cylinder-piston aggregate which is movable in unison with the equalization rod system. However, it is also possible to secure the cylinder rigidly at the frame and to permit two pistons to slide therein which are connected with equalization rods. Such a construction offers the possibility that a throttling cross section may be arranged in the cylinder space between the two pistons. The utilization of the cylinder which is ordinarily present anyhow in such equalization systems for purposes of a throttling arrangement offers the great advantage that the nodding or swinging movements of the vehicle about a horizontal cross axis which ordinarily cannot be suppressed by the purely equalizational spring system, may be dampened or suppressed effectively without any great constructional additional expenditures. Of course, such dampening or suppression of the opposite movements of the wheels or axles may also be realized in a particularly easy manner by purely pneumatic equalization spring systems.

In that case a spring each is interconnected advantageously into the connecting rods between each piston and the corresponding wheel or axle.

Further features, objects and advantages of the present invention will become more obvious from the following description when taken in connection with the accompanying drawing which shows for purposes of illustration only several embodiments in accordance with the present invention and wherein:

FIGURE 1 is a schematic partial cross sectional view through a fully pneumatic equalization spring system in accordance with the present invention.

FIGURE 1A is a partial cross-sectional view through a modified arrangement of the present invention, illustrating a rear axle system for use in the basic system illustrated by FIGURE 1.

FIGURE 2 is a plan view of the spring system in accordance with the present invention illustrated in FIGURE 1.

FIGURE 3 is a partial cross sectional view of an equalization spring system according to the present invention with mechanical springs, and FIGURE 4 is a partial cross sectional view similar to FIGURE 3 in which pneumatic springs are used for certain mechanical springs of FIGURE 3.

Referring now to the drawing wherein like reference numerals are used throughout the various views to designate like parts and more particularly to FIGURES 1 and 2, reference numeral 1 designates schematically the vehicle frame. The front wheels 2 and 3 are secured to half axles 4 and 5 respectively which may be individually suspended from the vehicle. The rear wheels 6 and 7 are mounted on the rear axle 8 which may be a rigid cross axle or of any other type suitable for rear axles, such as swinging half axles, etc. One pneumatic spring 9, 10, 11 and 12 each is associated with and operatively connected with one of the four wheels 2, 3, 6 and 7 respectively. The pneumatic springs 9 and 11 and the pneumatic springs 10 and 12 of each side of the vehicle are interconnected by an equalization line 13 and 14, respectively. The equalization lines 13 and 14 are provided with throttling places or passages 15 and 16.

The relative movement of the front half axle 5 with respect to the frame 1 is transmitted over a rod 17 and a lever 18 to a pneumatic switch 19. The same is also true of the transmission of the relative movement of the half axle 4 for which a similar motion transmitting or link system 17', 18' and pneumatic switch 19' may be provided.

Depending on the position of the lever 18 or 18' the pneumatic switch 19 or 19' permits the entry of pressurized air from the supply line 20 or 20' into the equalization line 14 or 13 or permits the escape of the pressurized air from lines 14 or 13 through the line 21 or 21'. Preferably the levers 18 and 18' do not effect directly the switching of the pressurized air to and from the equalizing line 14 or 13 but do so only by interposition of a delay means, such as, for instance, throttling places 30 provided in lines 20, 21 and 20', 21' as shown in FIGURE 1.

The bellows 22 of the pneumatic spring 12 for the rear wheel 7 is surrounded by a second bellows 23. The air space 23' between the two bellows 22 and 23 serves as additional spring and is connected with a pneumatic switch 25 over a line 24. The pneumatic switch 25 is actuated over a rod 26 and a lever 27 in response to the position of the rear axle 8 with respect to the frame 1. Consequently, the two rear pneumatic springs 11 and 12 are loaded in the same sense through the line 24 and through a corresponding line 28. Of course, separate pneumatic switches may be provided for each rear spring and suspension system in case of a rear axle of the swinging half-axle type.

The operation of the equalization spring system of FIGURES 1 and 2 during changes in the static load is as follows:

If it is assumed that the rear axle 8 at first moves in the direction toward the frame 1, then the lever 27 is rotated in a clockwise direction as viewed in FIGURE 1 whereby pressurized air reaches the additional air spaces 23' formed between bellows 22 and 23 of the rear spring system through the supply line 29 over the lines 24 and 28, respectively. Consequently, the rear axle will tend to move away or distance itself again from the frame 1 for such a length of time until the lever 27 is again in the horizontal position and the original desired distance corresponding to the predetermined value of the rear axle 8 from the frame 1 is again obtained.

Preferably the lever 27 does not effect directly the switching of the pressurized air but does so only by the interposition of a delay arrangement of any conventional construction such as throttling places 31 provided in lines 24 and 28 of the system so that the control arrangement does not react to every relative movement of the rear axle 8 with respect to the frame 1, as is the case continuously while the vehicle is being driven. In the manner described hereinabove, the predetermined desired value of the distance is again obtained notwithstanding the increased static load on the rear axle 8. However, the frame 1 would also assume an inclined position downwardly toward the front corresponding to the additional load of the front axle if the lever 18 had not rotated thereby in a counter-clockwise direction so that pressurized air could reach from the line 20 into the equalization line 14 and correspondingly also into the line 13 and therewith into the pneumatic springs 10 and 12 and into the pneumatic springs 9 and 11, respectively. In this manner the front axles and therewith front wheels 2 and 3 are brought back or returned again to the predetermined desired value of the distance with respect to the frame 1.

The reaction or feed back effect of this increase in pressure in the pneumatic spring and equalization system on the rear springs 11 and 12 is compensated for by the additional pneumatic rear springs so that in the final analysis the outward geometric appearance of the spring system is the same under load as under no-load conditions.

As mentioned above, in many cases it is more advantageous if the two bellows are disposed one behind the other in the longitudinal direction of the vehicle, namely ahead and behind the axle, respectively, as illustrated by FIGURE 1A. As illustrated in FIGURE 1A, the two bellows 22' and 23" are disposed ahead and behind the rear axle 8, respectively. The pneumatic switch 25, is actuated by lever 27 in response to the position of rear axle 8 in a manner similar to the operation of FIGURE 1. Those parts which are similar have been given the same reference numerals in both FIGURES 1 and 1A. The basic operation of the device of FIGURE 1A is the same as that of FIGURE 1.

In the construction according to FIGURE 3, the two wheels 51 and 52 are each supported on bell cranks 53 and 54 which in turn are pivotally supported about axles or shafts 55 and 56 rigidly secured to the frame 1. The free end of each bell crank 53 and 54 is connected with a piston 57 and 58, respectively over a spring-loaded yielding rod system. The spring system thereof consists of one main spring 59 and 60 each and of an additional spring 61 and 62 each the latter becoming effective only after a predetermined compression of the main springs 59 and 60 respectively. The pistons 57 and 58 slide in a cylinder 63 rigidly secured to the frame 1. The cylinder 63 is subdivided by means of a disk 64 provided with a throttle bore 80. Each bell crank 53 and 54 controls a hydraulic switch 65 and 66 provided with a pressure medium inlet or supply line 67 and 68 and an outlet or discharge line 69 and 70 respectively. The switch 65 supplies the space between the piston 57 and 58 with pressure oil over line 71 whereas the switch 66 supplies the cylinder 73 rigidly secured on the frame with pressure oil over line 72. A piston 74 is slidable in cylinder 73. The piston 74 is connected over a main spring 75 and an additional or auxiliary spring 76 with the angle lever 54 and with the axle 77.

The operation of the arrangement according to FIGURE 3 is as follows:

After the occurrence of a static load, the bell crank 54 rotates in a counter-clockwise direction. As a result thereof, the hydraulic switch 66 is actuated so as to permit the inflow of pressure oil into the cylinder 73 over line 72 for such a length of time until the piston 74 is pushed downwardly over such a distance that the right leg of the bell crank 54 is again horizontal. At the same time the part of the load which falls on the wheel 51 at first changes the angle lever 53 in a clockwise direction. This adjustment, however, is compensated for by the fact that pressure oil is forced into the space between the two pistons 57 and 58 over the hydraulic switch 65 and line 67 for such a length of time until under compression of the springs 59 to 62 the original position of the bell crank 53 is re-established.

FIGURE 4 corresponds essentially to FIGURE 3 except that pneumatic springs 59' and 60' have been substituted for the mechanical springs 59 and 60. However, the operation thereof is the same as that disclosed in FIGURE 3.

All of the described arrangements have in common that pneumatic or hydraulic throttling places 15, 16 or 80 are provided in the equalization system. With the aid of these throttling places 15, 16 or 80, nodding movements of the frame 1 with respect to the road bed during which the fluid medium in the lines 13 and 14 or in the cylinder 63 must move to and fro, are effectively dampened without any great additional constructional outlay.

The present invention is not limited to the embodiment described herein. The equalization spring system may be arranged between any wheels or axles, as desired, for example, also from the front right wheel or axle to the front left wheel or axle or from the right rear wheel or axle to the rear left wheel or axle, etc. Moreover, all types of springs in addition to the described pneumatic and coil springs may be used, for example, torsion rods, leaf springs or the like. Instead of the pneumatic medium, any other fluid media may be used which are compressible.

While I have shown several preferred embodiments according to the present invention, it is understood that the same is not limited thereto but is susceptible of many changes and modifications within the spirit of the present invention, and I intend to cover all such changes and modifications except as defined in the appended claims.

I claim:

1. A spring system for a vehicle with a frame comprising an equalization spring system including pressure fluid actuated spring means extending and operative between two wheel support means to effect spring equalization therebetween, a stabilization spring system including automatically adjustable additional pressure fluid actuated spring means between one of said wheel support means and said frame to re-adjust the distance between said one wheel support means and said frame to a predetermined desired value after a change in the static load and automatic regulating means responsive to a deviation in the distance between the other wheel support means and said frame from said predetermined desired value for automatically changing the load carrying capacity of said equalization spring system in the direction toward keeping constant said distance at said predetermined value after a change of static load on the vehicle.

2. A spring system according to claim 1 containing at least in part a pressure medium, wherein said automatic regulating means includes pneumatic switch means to enable inflow into or escape of the pressure fluid medium from said equalization spring system depending on the direction of the deviation of said other wheel support means from said predetermined desired value.

3. A spring system according to claim 2, wherein said additional spring means is formed as a pneumatic spring system, and further comprising pneumatic switch means for alternately filling or emptying said pneumatic spring system depending on the deviation of distance from said predetermined desired value of said one wheel support means from said frame.

4. A spring system according to claim 1, wherein said additional spring means is formed as a pneumatic spring system, and further comprising pneumatic switch means for alternately filling or emptying said pneumatic spring system depending on the deviation in distance from said predetermined desired value af said one wheel support means from said frame.

5. A spring system according to claim 1, wherein said equalization spring system and said additional spring means are of the pneumatic type with bellows, the pressure spaces of said spring system and of said spring means being delimited by said bellows, the bellows of said additional spring means surrounding the bellows of said spring system.

6. A spring system according to claim 1, wherein both said equalization spring system and said additional spring means are of the pneumatic type provided with bellows at least partially defining pressure spaces for said pressure fluid, said bellows being located ahead and behind the respective wheel support means.

7. A spring system according to claim 3, wherein said switch means each includes delay means to delay operation of said switch means until said deviation of the distance from said predetermined desired value of said wheel support means from the frame has occurred for a predetermined length of time as a result of the change in the static load.

8. A spring system according to claim 1, wherein each of said spring means and said automatic means includes delay means for delaying operation thereof in response to changes in the static load until such changes have occurred for a predetermined length of time.

9. A spring system according to claim 1, wherein said automatic means includes a hydraulically operated transmission member operatively connected with the equalization spring system, and means for enabling inflow into and escape from said hydraulically operated transmission member of an essentially incompressible pressure medium in response to said deviation of the distance between said other wheel support means and said frame.

10. A spring system according to claim 1, wherein said equalization spring system includes mechanical springs.

11. A spring system according to claim 10, wherein said automatic means includes hydraulic switch means and a hydraulically operated transmission member connected with said switch means so as to enable inflow or escape of an essentially incompressible pressure medium into or from said hydraulically operated transmission member depending on the direction of deviation of the distance between said other wheel support means and said frame from said predetermined value, and means connecting said hydraulic transmission member with said equalization system.

12. A spring system including rod means for connecting said hydraulic transmission with said equalization system according to claim 11, wherein said hydraulically operated transmission member includes a cylinder-piston aggregate movable in unison with said rod means of said equalization spring system.

13. A spring system according to claim 11, wherein said hydraulically operated transmission member includes a cylinder rigidly secured to said frame and two pistons slidingly accommodated in said cylinder and connected to said rod means.

14. A spring system according to claim 1, wherein said system is operative by means of a fluid medium, and wherein said system includes throttling means for dampening the opposite movements of said wheel support means by throttling the to-and-fro movement of said fluid medium.

15. A spring system according to claim 11, further comprising throttling means in said cylinder intermediate said two pistons, and means including at least one spring connecting each piston with a corresponding one of said wheel support means.

16. An equalization spring system extending and operative between two wheel support means of a motor vehicle to effect spring equalization therebetween comprising a line and a bellows connected at each end of said line and in operative engagement with a corresponding wheel support means to form a pnuematic equalization spring system, a pneumatic switch, means for connecting said pneumatic switch to one of said wheel support means to provide inflow into or escape of the pneumatic medium from said spring system depending on the direction of deviation of said one support means from the frame of the vehicle from a predetermined distance, automatically operated means including another bellows near the other wheel support means operatively connected between said other wheel support means and said frame to provide a readjusting system, pneumatic switch means operatively connected with said other wheel support means to control the inflow into or escape of a pneumatic medium from said second-mentioned bellows in response to deviations from said predetermined value in the distance of said other wheel support means from said frame, and throttling means in said line to dampen oscillatory movements of said pneumatic medium between said two wheel support means.

17. An equalization spring system extending and operative between two wheel support means to effect spring equalization therebetween comprising a cylinder, two pistons reciprocating in said cylinder switch means for each of said wheel support means, means including spring means connecting each of said pistons with a corresponding wheel support means, means connecting each switch means to the corresponding wheel support means to operate said switch means in response to deviations in the distance of the respective wheel support means from the vehicle frame from a predetermined distance, means connecting one of said switch means with said cylinder to supply or empty said cylinder of a fluid medium depending on the direction of deviation of one of said wheel support means, another cylinder with a piston therein, means including further spring means connecting staid second-mentioned piston with the other wheel support means, and means connecting said other switch means with said second-mentioned cylinder to supply to said second-mentioned cylinder a fluid medium or empty the fluid medium from said second-mentioned cylinder depending on the direction of deviation of said other wheel support means from said predetermined value, said first-mentioned cylinder being provided with throttling means intermediate said two first-mentioned pistons.

18. Spring equalization system according to claim 17, wherein said first-mentioned fluid medium is essentially incompressible.

19. A spring equalization system according to claim 18, wherein said first-mentioned spring means are formed only by mechanical springs.

20. An equalization spring system according to claim 18, wherein said first-mentioned spring means are formed at least in part by pneumatic springs.

References Cited in the file of this patent

UNITED STATES PATENTS

| | | |
|---|---|---|
| 2,361,575 | Thompson | Oct. 31, 1944 |
| 2,427,927 | Schutte | Sept. 23, 1947 |
| 2,607,610 | Allison | Aug. 19, 1952 |
| 2,914,338 | Kress | Nov. 24, 1959 |

FOREIGN PATENTS

| | | |
|---|---|---|
| B32,287 | Germany | May 17, 1956 |